United States Patent [19]

Johnson

[11] Patent Number: 5,639,068
[45] Date of Patent: Jun. 17, 1997

[54] CABLE LEAD TOOL

[75] Inventor: Andrew N. Johnson, Ypsilanti, Mich.

[73] Assignee: Michael W. Cummings, Ypsilanti, Mich.

[21] Appl. No.: 444,526

[22] Filed: May 19, 1995

[51] Int. Cl.$^6$ .................................................... B65H 59/00
[52] U.S. Cl. ..................................................... 254/134.3 FT
[58] Field of Search ................... 254/134.3 R, 134.3 FT; 15/104.33; 403/296, 292, 301

[56] References Cited

U.S. PATENT DOCUMENTS

| | | | |
|---|---|---|---|
| 1,108,748 | 8/1914 | Hampton . | |
| 2,663,748 | 12/1953 | Carr et al. . | |
| 2,727,720 | 12/1955 | Barth | 254/134.3 FT |
| 3,814,383 | 6/1974 | Jackson . | |
| 3,858,848 | 1/1975 | MacFetrich | 254/134.3 FT |
| 4,101,114 | 7/1978 | Martin et al. | 254/134.3 FT |
| 4,337,923 | 7/1982 | Smith | 254/134.3 FT |

FOREIGN PATENT DOCUMENTS

| | | | |
|---|---|---|---|
| 3524076 | 11/1986 | Germany | 254/134.3 R |
| 60-70892 | 4/1985 | Japan | 254/134.3 R |

*Primary Examiner*—Robert C. Watson
*Attorney, Agent, or Firm*—James M. Deimen

[57] ABSTRACT

A utility cable lead tool and method of use of the tool for leading cable such as unitary communications cable with the tool in installation on utility poles. The tool has a body with an incline on the exterior, a through aperture and a blind aperture. The cable end is placed within the tool with the wire rope portion of the cable uncovered and extending through the through aperture of the tool body. The uncovered wire rope is attached to a tow cable for positioning in the desired location. The incline on the body facilitates the travel of the cable lead tool through the positioning hooks or pulleys on the utility poles and through tree limbs and brush between poles.

11 Claims, 1 Drawing Sheet

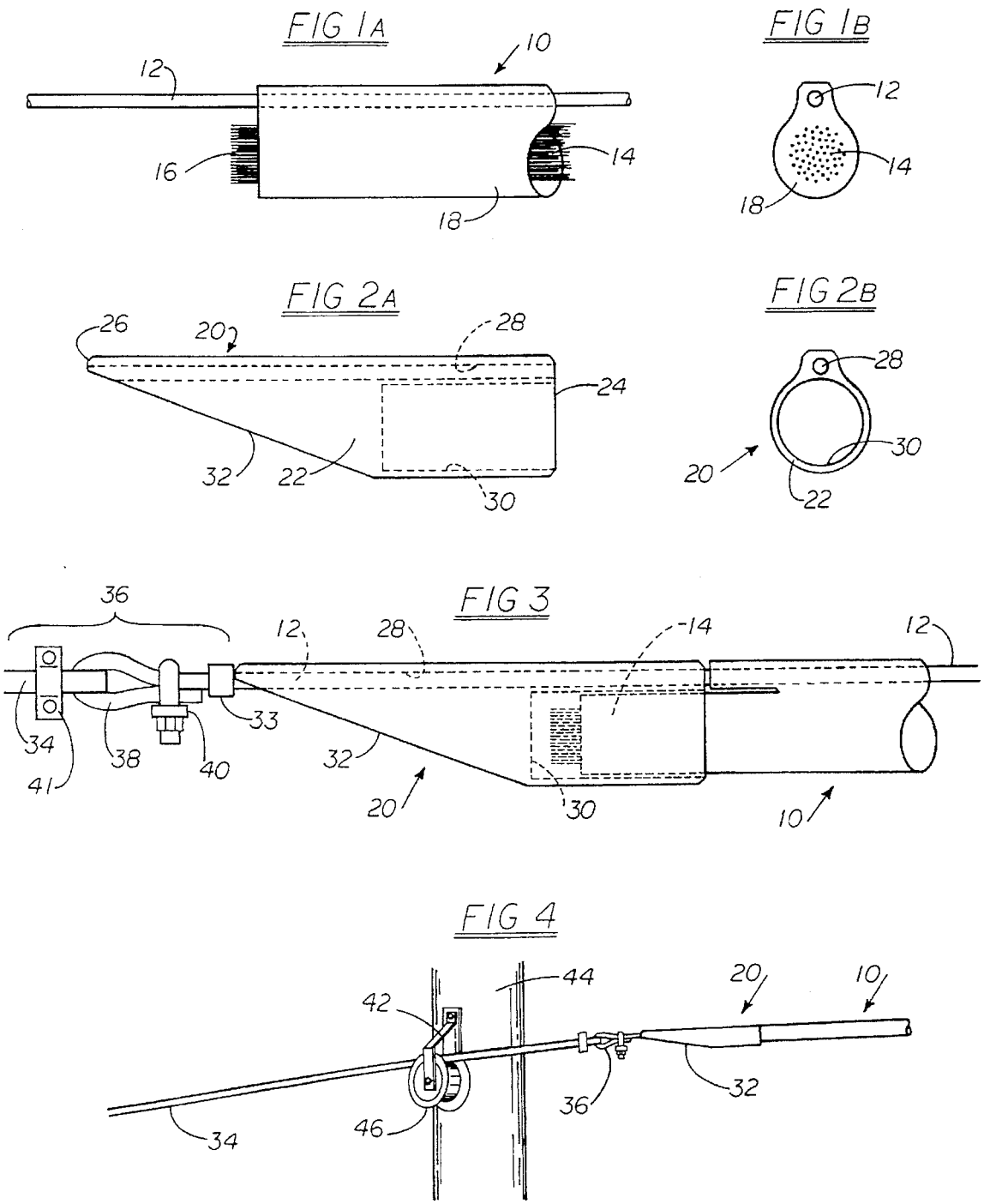

CABLE LEAD TOOL

BACKGROUND OF THE INVENTION

The field of the invention pertains to multistrand cable communications utility lines. In particular, the invention pertains to a tool and a method of using the tool to lead modern cable for cable TV and telephone communications lines. Preparing the cable for placement in the correct position to allow the cable to be lead through various obstructions can require lengthy preparation. This lengthy preparation is due to the extensive wrapping of the end of the cable with tape that is necessary to connect the end of the cable with a towing device and create a configuration less likely to entangle as the line is drawn through trees and brush from pole to pole.

Attempts have been made to attach the cable to a towing device and a guide device. In the past, an existing support line has been used for guiding the cable into place. The use of an existing support line requires some kind of attachment of the cable to the existing line. This has entailed the use of guide loops or the surrounding of the cable and the guide line with coils to keep the cable positioned properly during placement. However, guide lines are difficult to work with and presuppose that an existing line is in place from utility pole to utility pole. Further, the wrapping of the cable with tape or the placement of the cable within a coil is time consuming and can often be frustrating when the cable gets caught in the coil.

Some of the attempts to attach a cable to a towing and guiding device are as follows: U.S. Pat. No. 1,108,748 discloses a cone shaped cable guide that is used with cable support rings.

U.S. Pat. No. 2,663,748 discusses a swivel connector for a cable puller that is provided with clamping means for fastening the cable and strand to the puller which is in turn connected to a tow line. A depending arm extends from each member apparently to prevent backtravel of the cable.

U.S. Pat. No. 3,814,383 shows a cable puller mounted on an existing messenger cable. The cable puller slides on the existing support cable.

Thus, no known tool exists to facilitate an easy attachment of a modern unitary support and communications cable to a single tow line and an easy method of use of the tool to facilitate travel of the cable through brush as well as through pole connectors.

SUMMARY OF THE INVENTION

The invention is directed to a tool for leading a cable line, but is not limited thereto. Essentially, the invention comprises a tool body having both a through aperture and a blind aperture therein. The through aperture allows an uncovered segment of the wire rope portion of the cable to be inserted through and to extend beyond the tool body. The blind aperture of the tool body allows the communication portion of the cable to be inserted and to be fully protected and prevented from catching on obstructions or twisting while being pulled. An incline on the tool body facilitates the smooth movement of the tool as it is pulled thereby pulling the cable into position.

Initially, a unitary cable is placed into the tool. The cable first must have the cover or sheathing on the wire rope portion stripped back or removed from one end. Thereafter, the communication portion must be cut back to allow the exposed wire rope portion to extend past the communication portion. Subsequently, the uncovered wire rope portion is fed through the body by way of the through aperture. By pulling the uncovered wire rope portion of the cable through the body of the cable lead tool, the cut back portion of the communication portion is emplaced into the blind aperture. The wire rope portion is then attached to a cable tow line. As the cable tow line pulls the cable, the incline on the tool body glides through the hardware on the poles and through any brush or tree limbs that could possibly hang up the cable.

The necessary action required to achieve the placement of the cable is thus enhanced and facilitated. Moreover, no damage can easily befall the exposed ends of the communication portion of the cable as the exposed ends are protected by being emplaced in the blind aperture. Furthermore, the preparation time to place the cable in the cable lead tool and to attach the cable to the tow cable is substantially reduced from the time required by previous methods. Thus, more cable can be placed in approximately the same amount of time as compared to the known tools and methods of use.

The invention can be advantageously employed for new installations or to retrofit existing cable systems. While directed to communication cables as discussed above, the invention herein disclosed is not limited thereto but has other uses such as for power cables and decorative cables.

For a more complete understanding of the present invention, reference is made to the following detailed description when read in conjunction with the accompanying drawings wherein like reference characters refer to like elements throughout the several views.

BRIEF DESCRIPTION OF THE DRAWINGS

FIG. 1A illustrates a side view of a typical cable;

FIG. 1B illustrates a cross-section view through a typical cable;

FIG. 2A illustrates side view of the cable lead tool according to the invention;

FIG. 2B illustrates an end view of the cable lead tool of FIG. 2A;

FIG. 3 illustrates a side view of the cable lead tool according to the invention showing the to installed on the cable; and FIG. 4 illustrates an environmental view of the cable lead tool in use.

DESCRIPTION OF THE PREFERRED EMBODIMENT

In FIG. 1, a typical cable generally denoted as 10 is thereshown. The cable 10 comprises a wire rope portion 12 generally of steel along with a communication portion 14. The communication portion 14 can have multiple lines 16 that may be comprised of copper wires, fiber optic fibers or other communication materials. The wire rope portion 16 stiffens the cable 10 and protects and supports the communication portion 14 of the cable 10. The cable 10 is surrounded by a cover 18 to sheath and protect the multiple lines 16 and to join the wire rope portion 12 to the communication portion 14. The covering 18 can be extruded plastic such as PVC plastic.

The multiple lines 16 are better shown in cross section in FIG. 1B which also shows the relationship of the wire rope portion 12 to the multiple lines 16 and the surrounding unifying covering 18.

Now turning to FIGS. 2A and 2B the cable lead tool generally denoted by 20 of the invention is thereshown. The cable lead tool 20 comprises a body 22 having two ends 24, 26 with two apertures 28, 30 therein. One of the apertures is a through aperture 28 and extends completely through the body 22 from one end 24 to the other end 26. The other aperture is a blind aperture 30 which extends only partway into the body 22 from end 26 and consequently does not extend completely through the body 22. The body also has an incline 32 from near the end 26 of the body 22 and distant from the end 24 having the blind aperture 30. As shown in FIG. 2B, the transverse configuration of the body 22 of the cable lead tool 20 is similar to the cross-sectional configuration of the cable 10 as shown in FIG. 1B with the exception of the incline 32 portion of the body. As shown the incline 32 may be planar or wedge shaped.

The body 22 of the cable lead tool 20 can be formed from any lightweight, strong, abrasion resistant material, such as metal or plastic. A material having the surface lubricity properties of Delrin nylon would be useful. The body 22 can be formed from rod shaped raw material, cast or injection molded. Other materials such as steel, aluminum or other metals could also be advantageously employed.

The cable lead tool 20 is shown as used with the cable 10 in FIG. 3. The cable lead tool 20 is affixed to the cable 10 by cutting the cover 18 off the wire rope portion 12 and then cutting back the communication portion 14 of the cable 10. The uncovered wire rope portion 12 is pulled completely through the aperture 28 of the cable lead tool body 22. The uncovered wire rope portion 12 of the cable 10 exits from the cable lead tool 20 at end 26 near the incline 32 of the body 22. A small piece of optional adhesive tape 33 may be adhered between the wire rope portion 12 and the cable lead tool 20 where the wire rope portion 12 exits from the body 22 of the cable lead toot 20. The tape 33 prevents the tool 20 from accidentally sliding off the wire rope 12. The cut back communication portion 14 of the cable 10 is held within the blind aperture 30 to keep the cable aligned behind the tool 20.

The wire rope portion 12 that extends beyond the cable lead tool 20 is attached to a tow line or cable 34 by means for attaching 36. The means for attaching 36 can involve forming the uncovered wire rope portion 12 into a loop 38 and then clamping 40 the loop 38 around the tow line or cable 34 which is formed into a similar loop and clamped 41. Any other adequate means for temporarily attaching two wire ropes end to end may be substituted.

For example, in substitution for the tape 33 and the loops and clamps shown in FIG. 3, devices such as the Guy-Grip® from Preformed Line Products of Cleveland, Ohio, may be used for the attaching means 36. Such devices are less likely to catch on branches or pole mounted support and holding devices disclosed below.

The actual positioning and installation of the cable 10 with the cable lead tool 20 is better shown in FIG. 4. The cable lead tool 20 has been attached to the cable 10 with the uncovered wire rope portion 12 of the cable 10 that extends from the cable lead tool 20 being joined to the tow cable 34. The cable lead tool 20 is shown being drawn by the tow cable 34 to pull the cable 10 into position through a temporary holder 42 placed on a pole 44. A roller 46 mounted on the holder 42 helps the cable lead tool 20 and cable 10 move through the holder 42. The incline 32 on the body 22 enables the cable lead tool 20 to smoothly ride through the holder 42. The incline 32 on the body 22 of the cable lead tool 20 eliminates entanglement of the cable 10 in the holders 42 or in any tree branches, brush or other debris between poles 44 during placement of the cable 10. J-hooks or other means to support the tow cable 34 and cable 10 on the utility poles 44 may be substituted for holder 42.

I claim:

1. A cable lead tool comprising a body, the body having a first end and a second end, the body having a first aperture and a second aperture with one of the apertures larger in section than the other aperture, the first aperture extending through the body between the first end and the second end;

the second aperture extending from one of the first and second ends partway through the body and terminating in a blind hole; and an incline from the other of the first and second ends, the incline formed from near the first aperture towards the second end.

2. The cable lead tool according to claim 1 wherein the body has a length and a generally round section with a smaller generally round section connected to the first generally round section.

3. The cable lead tool for leading cable according to claim 2 wherein the first aperture extends within the length of the smaller generally round section of the body and the second aperture extends part of the length of the generally round section of the body.

4. The cable lead tool according to claim 3 wherein the incline on the body is a planar incline.

5. A method of using a cable lead tool, the tool comprising a body, the body having a first end and a Second end, the body having a first aperture and a second aperture with one of the apertures larger in section than the other aperture, the first aperture extending through the body between the first end and the second end;

the second aperture extending from one of the first and second ends partway through the body and terminating in a blind hole; and an incline from the other of the first and second ends, the incline formed from near the first aperture towards the second end, and the method comprising stripping away part of the cover of the cable to uncover a steel wire rope portion;

cutting away part of a communication portion of the cable past the uncovered steel wire rope portion to extend the uncovered steel wire rope portion beyond the communication portion;

extending the uncovered steel wire rope portion through the first aperture of the tool;

pulling the uncovered steel wire rope portion through the first aperture to engage the communication portion of the cable with the second aperture of the tool;

connecting the uncovered steel wire rope portion to a tow cable; and towing the cable into position.

6. The method of using a cable lead tool according to claim 5 further comprising affixing a small amount of adhesive tape between the uncovered steel wire rope portion of the cable and the tool body at the one of the first or second ends of the body closer to the tow cable.

7. A cable lead tool for installation of unitary communications cable, the cable comprising in cross-section a wire rope support portion, a multiple strands of communications lines portion and an integral protective cover thereover, the tool comprising a body, first means on the body to engage a stripped portion of the wire rope support portion, two spaced apart opposite ends on the body, said first means permitting the wire rope to extend beyond both ends of the body, second means on the body to engage the end of the communications lines portion adjacent the stripped portion of the wire rope support portion, said second means adapted to align the communications lines portion with the body, and incline means on the body to engage obstructions to movement of the body without entanglement of the body and obstructions.

8. The cable lead tool of claim 7 wherein the first means comprises an aperture through the body from end to end.

9. The cable lead tool of claim 7 wherein the second means comprises a blind hole extending into the body from one end.

10. The cable lead tool of claim 7 wherein the incline comprises a planar surface extending along the body from one end.

11. The cable lead tool of claim 7 wherein the first means comprises an aperture through the body from end to end, the second means comprises a blind hole extending into the body from one end, and the incline comprises a planar surface extending from the end opposite the blind hole end on the body.

* * * * *